(12) United States Patent
Sauder et al.

(10) Patent No.: US 11,479,405 B2
(45) Date of Patent: Oct. 25, 2022

(54) LIQUID PRODUCT STORAGE AND DELIVERY SYSTEMS, METHODS AND APPARATUS

(71) Applicant: 360 YIELD CENTER, LLC, Morton, IL (US)

(72) Inventors: Greggory Sauder, Tremont, IL (US); Timothy Sauder, Tremont, IL (US); Nowell Moore, Tremont, IL (US)

(73) Assignee: 360 YIELD CENTER, LLC, Morton, IL (US)

( * ) Notice: Subject to any disclaimer, the term of this patent is extended or adjusted under 35 U.S.C. 154(b) by 151 days.

(21) Appl. No.: 16/519,170

(22) Filed: Jul. 23, 2019

(65) Prior Publication Data
US 2020/0024066 A1 Jan. 23, 2020

Related U.S. Application Data

(60) Provisional application No. 62/702,295, filed on Jul. 23, 2018.

(51) Int. Cl.
| | | |
|---|---|---|
| B65D 88/12 | (2006.01) | |
| B65D 90/04 | (2006.01) | |
| B65D 90/20 | (2006.01) | |
| B65D 90/00 | (2006.01) | |
| B65D 88/22 | (2006.01) | |

(52) U.S. Cl.
CPC ........ *B65D 88/128* (2013.01); *B65D 88/22* (2013.01); *B65D 90/0046* (2013.01); *B65D 90/046* (2013.01); *B65D 90/205* (2013.01)

(58) Field of Classification Search
CPC .... B65D 90/046; B65D 88/129; B65D 88/22; B65D 90/04
USPC ......................................................... 220/4.12
See application file for complete search history.

(56) References Cited

U.S. PATENT DOCUMENTS

| | | | | |
|---|---|---|---|---|
| 8,302,603 | B1 * | 11/2012 | Weber | A62B 7/14 128/205.17 |
| 10,836,298 | B1 * | 11/2020 | Bonnar | B65D 90/046 |
| 2004/0079691 | A1 * | 4/2004 | Jowett | C02F 3/04 210/220 |
| 2006/0078412 | A1 * | 4/2006 | Hagemann | B65D 88/60 414/467 |
| 2009/0090724 | A1 * | 4/2009 | Childress | B64D 37/06 220/560.01 |
| 2012/0132650 | A1 * | 5/2012 | Buonerba | B65D 88/1606 220/1.6 |
| 2013/0001224 | A1 * | 1/2013 | Payne | B65D 90/041 220/601 |
| 2014/0097182 | A1 * | 4/2014 | Sheesley | B65D 90/046 220/1.6 |
| 2015/0027793 | A1 * | 1/2015 | Janzen | A01C 23/008 180/9.42 |
| 2015/0053675 | A1 * | 2/2015 | Morales | F17C 11/007 220/4.12 |

FOREIGN PATENT DOCUMENTS

WO   WO 2015176146   *  5/2014

* cited by examiner

*Primary Examiner* — Anthony D Stashick
*Assistant Examiner* — Raven Collins
(74) *Attorney, Agent, or Firm* — Klintworth & Rozenblat IP LLP

(57) ABSTRACT

A liquid product storage and delivery system is provided. The liquid product storage and delivery system includes a storage tank and a liquid bladder supported inside of the storage tank.

18 Claims, 1 Drawing Sheet

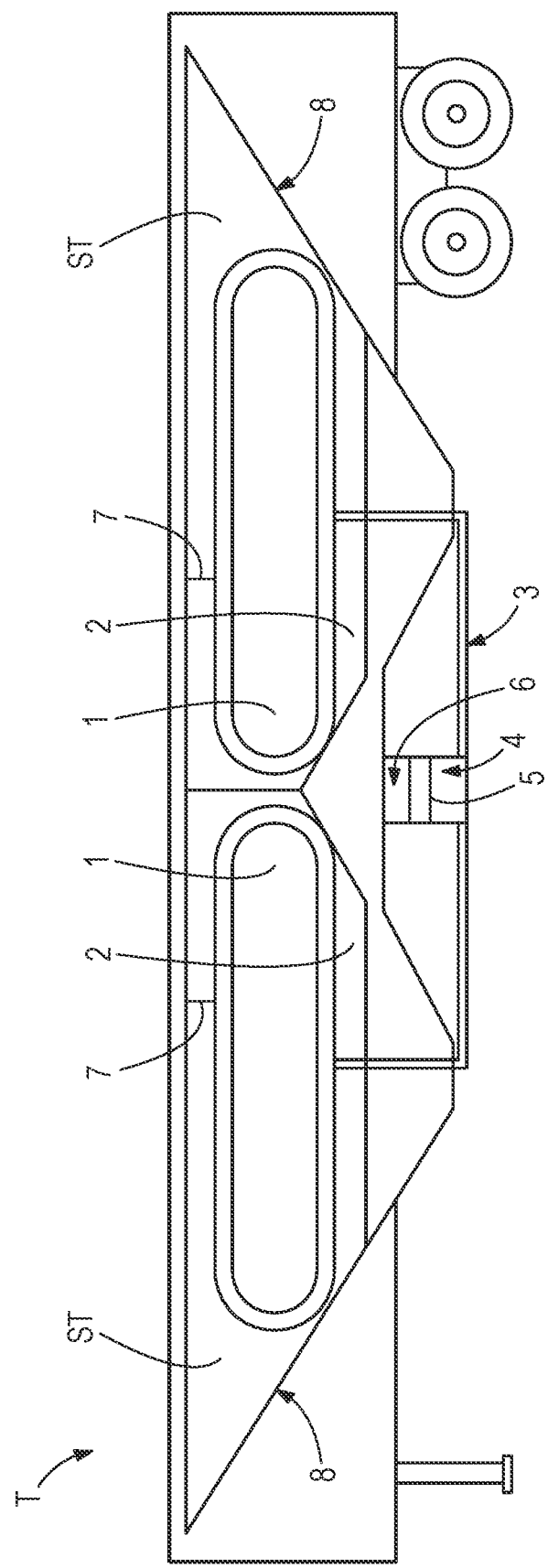

LIQUID PRODUCT STORAGE AND DELIVERY SYSTEMS, METHODS AND APPARATUS

CROSS-REFERENCE TO RELATED APPLICATIONS

This application claims the benefit of priority to U.S. provisional application No. 62/702,295, filed on Jul. 23, 2018, which is hereby incorporated by reference in its entirety.

FIELD OF THE DISCLOSURE

This disclosure relates to liquid product storage and delivery systems, methods, and apparatus.

SUMMARY

In one embodiment, a liquid product storage and delivery system is disclosed. The liquid product storage and delivery system comprises a storage tank and a liquid bladder supported inside of the storage tank.

In another embodiment, a liquid product storage and delivery system is disclosed. The liquid product storage and delivery system comprises a storage tank and a rigid insert tank inserted inside of the storage tank.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

FIG. 1 illustrates a liquid product storage and delivery system implemented in a trailer having one or more (e.g., two) internal tank volumes.

DETAILED DESCRIPTION

Referring to FIG. 1, a liquid product storage and delivery system is shown implemented in a trailer T having one or more internal tank volumes. The trailer T may be of the kind commonly known as a "double-drop" trailer in some embodiments. A liquid bladder 1 is stored in each of the storage tanks ST of the trailer T. The liquid bladder 1 may be made of a flexible material such as a PVC fabric, vinyl fabric, etc. In some embodiments, rather than resting entirely on a bottom surface of the trailer storage tank ST, each liquid bladder 1 is at least partially supported on a platform 2 (e.g., metal platform) provided near and above the bottom surface of the storage tank ST. The platform 2 is optionally welded in place inside the trailer storage tank ST. In some embodiments, the platform 2 includes one or more openings for receiving an outlet 3 therethrough. The outlet 3 is optionally in fluid communication with an internal volume of bladder 1 for transfer of liquid into or out of the bladder 1. In some embodiments, the outlet 3 is in fluid communication with a pump 4 and/or distribution 5 system, e.g., via a manifold 6.

In some embodiments, support members 7, such as hooks, are supported at an upper end of the trailer T and attached (e.g., removably attached) to the bladder 1 for holding an upper surface of the bladder 1 at an elevated position relative to platform 2.

In some embodiments, a plurality of bladders 1 are stored in each storage tank ST of the trailer T. In some such embodiments the plurality of bladders may be side by side or disposed in front-to-back relation. In some embodiments, dividing walls (e.g., metal walls, etc.) may be provided in the storage tank ST for separating a plurality of bladders 1 in the storage tank ST.

Each bladder in such embodiments optionally has an associated opening in the platform 2 for receiving an outlet 3 of the bladder 1 therethrough.

In some alternative embodiments, a rigid insert tank (e.g., plastic such as polyethylene or metal or other material) is inserted in the trailer storage tank ST instead of a flexible bladder 1. In some such embodiments, the rigid insert tank is optionally shaped to fit inside the trailer storage tank ST. In some such embodiments, the additional platform 2 may be omitted and replaced with a lower floor of the rigid insert storage tank, which may have an outlet 3 provided therein in communication with an internal volume of the rigid insert tank. In some embodiments, a plurality of rigid insert tanks may be shaped to fit together (e.g., in a honeycomb or other arrangement) to form a combined shape which fits within and/or is secured in position by the trailer storage tank ST.

In some embodiments, a rigid (e.g., metal or poly) frame 8 is provided which is shaped to fit within and/or be secured in position by the trailer storage tank ST. In some such embodiments, the frame 8 is configured to support one or more rigid insert tanks or one or more flexible bladders.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A liquid product storage and delivery system comprising:
   a storage tank;
   at least one platform disposed within the storage tank;
   a plurality of liquid bladders supported inside of the storage tank by the at least one platform;
   a plurality of openings disposed in said at least one platform;
   a plurality of outlets received in the plurality of openings, each of the plurality of outlets in fluid communication with an internal volume of an associated one of the plurality of liquid bladders, said plurality of outlets extending through said at least one platform; and
   support members attached to the plurality of liquid bladders, the support members holding upper surfaces of the plurality of bladders at elevated positions relative to the at least one platform.

2. The liquid product storage and delivery system of claim 1, wherein the at least one platform is disposed above a bottom surface of the storage tank.

3. The liquid product storage and delivery system of claim 1, wherein the at least one platform is welded inside of the storage tank.

4. The liquid product storage and delivery system of claim 1, wherein the pump is in fluid communication with said plurality of outlets.

5. The liquid product storage and delivery system of claim 1, further comprising a distribution system in fluid communication with said plurality of outlets.

6. The liquid product storage and delivery system of claim 1, further comprising a manifold, and a pump and/or distribution system, wherein the manifold connects said plurality of outlets to the pump and/or the distribution system.

7. The liquid product storage and delivery system of claim 1, wherein the support members comprise hooks.

8. The liquid product storage and delivery system of claim 1, wherein the plurality of liquid bladders are disposed side-by-side or in front-to-back relation.

9. The liquid product storage and delivery system of claim 1, wherein the at least one platform comprises a plurality of platforms, each of the plurality of platforms respectively supporting one of the plurality of liquid bladders.

10. The liquid product storage and delivery system of claim 1, further comprising at least one dividing wall separating the plurality of liquid bladders.

11. The liquid product storage and delivery system of claim 1, wherein the plurality of liquid bladders are flexible.

12. A liquid product storage and delivery system comprising:
   a storage tank; and
   a plurality of rigid insert tanks inserted inside of the storage tank.

13. The liquid product storage and delivery system of claim 12, further comprising a plurality of outlets, wherein the plurality of rigid insert tanks each comprise a lower floor comprising an opening, each of the plurality of outlets in fluid communication with an internal volume of one of the plurality of rigid insert tanks extending through the opening in its lower floor.

14. The liquid product storage and delivery system of claim 12, wherein the plurality of rigid insert tanks are secured and/or fitted together.

15. The liquid product storage and delivery system of claim 12, further comprising a frame disposed inside of the storage tank, the frame supporting the plurality of rigid insert tanks.

16. The liquid product storage and delivery system of claim 1, wherein longitudinal axis of the plurality of liquid bladders are disposed parallel to at least one surface of the at least one platform upon which the plurality of liquid bladders are disposed.

17. A liquid product storage and delivery system comprising:
   a storage tank;
   a platform disposed above a bottom surface of the storage tank inside of the storage tank;
   a liquid bladder supported inside of the storage tank by the platform; and
   a support member, wherein the support member is attached to the liquid bladder holding an upper surface of the liquid bladder at an elevated position relative to the platform.

18. The liquid product storage and delivery system of claim 17, wherein the support member comprises at least one hook.

* * * * *